United States Patent [19]

Paavonen

[11] Patent Number: 5,485,635
[45] Date of Patent: Jan. 16, 1996

[54] CHANGING A CALL IDENTIFIER FOR CALL TERMINATION IN A DIGITAL TDMA RADIO SYSTEM

[75] Inventor: Tapio Paavonen, Saarijärvi, Finland

[73] Assignee: Nokia Telecommunications Oy, Espoo, Finland

[21] Appl. No.: 302,787
[22] PCT Filed: Jan. 11, 1994
[86] PCT No.: PCT/FI94/00012
§ 371 Date: Sep. 12, 1994
§ 102(e) Date: Sep. 12, 1994
[87] PCT Pub. No.: WO94/16533
PCT Pub. Date: Jul. 21, 1994

[30] Foreign Application Priority Data

Jan. 11, 1993 [FI] Finland .................................. 930096

[51] Int. Cl.$^6$ .............................. H04B 7/26; H04Q 7/30; H04Q 7/32
[52] U.S. Cl. .......................... 455/54.1; 455/56.1; 370/60; 370/110.1; 379/63
[58] Field of Search ......................... 379/59, 63; 370/24, 370/29, 95.1, 95.3, 110.1, 68.1, 60, 112; 455/33.1, 33.2, 53.1, 54.1, 54.2, 56.1, 32.1, 38.1, 38.2, 58.1, 58.2

[56] References Cited

U.S. PATENT DOCUMENTS

| | | | |
|---|---|---|---|
| 4,646,345 | 2/1987 | Zdunek et al. | 455/38.1 |
| 4,916,691 | 4/1990 | Goodmen | 370/60 |
| 4,984,290 | 1/1991 | Levine . | |
| 5,043,983 | 8/1991 | Dorst et al. | 370/110.1 |
| 5,204,949 | 4/1993 | Yasue et al. | 370/112 |

FOREIGN PATENT DOCUMENTS 0520433  12/1992  European Pat. Off. .

OTHER PUBLICATIONS

MPT 1343, Performance Specification: System Interface Specification for radio units to be used with commercial trunked networks operating in Band III sub-bands 1 and 2, Jan. 1988, revised Sep. 1991.
MPT 1327, A Technical Overview of the United Kingdom PMR Trunking Standards.

*Primary Examiner*—Reinhard J. Eisenzopf
*Assistant Examiner*—Lisa Charouel
*Attorney, Agent, or Firm*—Cushman Darby & Cushman

[57] ABSTRACT

In a call control method in a digital TDMA radio system a mobile station (MS) is commanded to a traffic channel for a call by signalling performed on the control channel. In accordance with the invention, a call identifier is assigned for the call to be established and sent intermittently on the traffic channel during the call. The mobile station (MS) is commanded to terminate the call and to leave the traffic channel by changing the call identifier sent on the traffic channel. The invention also relates to a digital TDMA radio system, a method for call release in terminal equipment in a digital TDMA radio system, and semiduplex terminal equipment.

10 Claims, 4 Drawing Sheets

CHANGING A CALL IDENTIFIER FOR CALL TERMINATION IN A DIGITAL TDMA RADIO SYSTEM

FIELD OF THE INVENTION

The present invention relates to a call control method in a digital TDMA radio system comprising mobile radio stations and a fixed radio network.

BACKGROUND OF THE INVENTION

Radio networks usually operate in such a way that the signalling required for establishing calls (as well as for the registration of MSs with the system) is performed on a control channel and the speech or data communication during the calls is conducted on traffic channels. This requires each base station to have more than one channel, since at least one channel is needed as a control channel and at least one channel as a traffic channel. Typically one control channel and several traffic channels are provided. In some radio networks, a less complicated operation is obtained by utilizing a single channel for both the control signalling and the speech communication. Furthermore, radio networks with very low traffic levels may be single-channel systems.

Radio traffic can be of three different types: 1) simplex, 2) semiduplex or 3) duplex.

In simplex operation, mobile stations MS employ the same frequency for traffic in both directions. Thus, when one party is speaking (and presses the transmission switch or pressel), the other is listening. During listening, the receiver and the loudspeaker of the listening party are muted. The simplest radio systems operate in this way. If two or more mobile stations communicate with one another without any base station or any other radio system, the mobile stations operate in the simplex mode.

The semiduplex mode utilizes for the traffic two frequencies, i.e. one frequency pair. The transmitters of both mobile stations (or in a group call, all mobile stations) are tuned to one frequency and the receivers to the other frequency. Naturally, these frequencies are reversed at the base station (i.e. the transmitting frequency of the mobile station is the receiving frequency of the base station, and vice versa). Yet also in this case it is impossible for the transmitting and receiving subscriber to speak simultaneously. The receiver and the loudspeaker of the transmitting mobile station are muted during the transmission. The semiduplex mode enables the use of fixed stations, such as telephone or exchange interfaces or special control points. A control point (CP) is a more or less conventional telephone set connected to an exchange and may be used for performing various standby tasks. The semiduplex mode allows effective utilization of the radio frequencies, since within the area of one base station two or more mobile stations may use the same frequency pair.

The operation of a duplex network is similar to that of a normal telephone network, that is, both subscribers can speak and hear one another for the entire duration of the call. Such networks include public land mobile networks, for instance. In a network of this kind, two pairs of channels must be reserved for a call between two mobile stations.

Semiduplex-type radio networks (networks in which mobile station users cannot speak simultaneously during a call) are always attended by the problem of ensuring that call release is received if the system clears down the call (for instance in order to allocate the channel for an emergency call). If one of the subscribers is transmitting during the release operation, the pertinent mobile station is not capable of receiving and hence will not receive the release message. In consequence, the mobile station remains on the traffic channel and participates in the next call as well.

One has generally attempted to solve this problem in trunked networks (networks in accordance with the MPT 1327 and 1343 specifications, for instance) by sending a special release message at the beginning of each call, commanding all unintended parties possibly participating in the call to leave the traffic channel. This is a relatively feasible solution as such, even though a subscriber can, by pressing the pressel (transmission switch) for an extended period, succeed in bypassing receipt of these messages and remain with the call even thereafter. For this reason, the special release messages are normally repeated later during the call. A drawback with this procedure is that part of the capacity of the traffic channel must be used for transmission of traffic that is unnecessary for the call, and in practice this also disturbs the telephone users.

DISCLOSURE OF THE INVENTION

It is an object of the present invention to ensure, more efficiently and with less disturbance than heretofore, that mobile radio stations leave the traffic channel after call release in a TDMA-type semiduplex radio system.

This object is achieved according to the invention by a call control method in a digital TDMA radio system comprising mobile radio stations and a fixed radio network with base stations, each of said base stations having at least one carrier for conveying control channels and traffic channels in TDMA time slots, said method comprising steps of commanding a mobile station to a traffic channel for a call by signalling performed on the control channel at the beginning of the call; commanding the mobile station through the traffic channel to terminate the call and to leave the traffic channel at the end of the call. The method is characterized by steps of assigning a call identifier for the call to be established; sending the call identifier intermittently on the traffic channel during the call; commanding the mobile station to terminate the call and to leave the traffic channel by changing said call identifier sent on the traffic channel at the end of the call.

According to the invention, each call on the same traffic channel (i.e. in the same time slot) in a TDMA (Time Division Multiple Access) radio system is provided with a call identifier such that at least two successive calls have different call identifiers. The system assigns the call identifier at the beginning of the call and inserts it in every downlink burst sent on the traffic channel. The MS stores the call identifier it has received at the beginning of the call and thereafter monitors the call identifier it receives in each burst and remains on the traffic channel and participates in the call as long as the call identifier received in the bursts is the same as the one received at the beginning of the call. As the system releases the call and/or initiates a new call, it changes the call identifier to be sent in the bursts on the traffic channel. When the MS detects change of the call identifier, it knows that the original call has been terminated and leaves the traffic channel. The identifying of calls in accordance with the invention and the call release based thereon effectively ensures that the MS will not remain dangling on the traffic channel even though the call has been released. The invention also eliminates sending of call release messages to the MS, which reduces the signalling load.

The invention also relates to a digital TDMA radio system comprising mobile radio stations; a fixed radio network comprising base stations each having at least one carrier for conveying control channels and traffic channels in TDMA time slots; call control means for controlling call establishment of the mobile radio stations by signalling sent on control channels and for controlling call release by control information sent on a traffic channel. In accordance with the invention, the control information sent on a traffic channel includes a call-specific call identifier, and the mobile station comprises means for activating clearing of the mobile station from the call in response to change of the call identifier during the call.

The invention also relates to a method for call release in terminal equipment in a digital TDMA radio system. According to the invention, in the method a call-specific call identifier is received in each burst on the traffic channel during the call; the call identifier received at the beginning of the call is stored; call identifiers subsequently received are compared with the stored call identifier; the call is cleared when change of the call identifier is detected.

The invention further relates to semiduplex terminal equipment for a digital TDMA radio system, wherein several control channels and traffic channels are conveyed in TDMA time slots on each radio channel, comprising an antenna; a transmitter; a receiver; a transmission switch for alternately connecting the transmitter and the receiver to the antenna; a frequency synthesizer for tuning the transmitter and the receiver to a desired radio channel; control means for controlling the operation of the terminal equipment and for processing control messages received on the calling and traffic channels. In accordance with the invention, the control means is responsive to a call-specific call identifier sent on the traffic channel during the call for initiating clearing from the call upon detection of change of the call identifier during the call.

BRIEF DESCRIPTION OF THE DRAWINGS

In the following the invention will be set forth in greater detail by means of exemplary embodiments with reference to the accompanying drawings, in which.

PREFERRED EMBODIMENTS OF THE INVENTION

Figure 1:
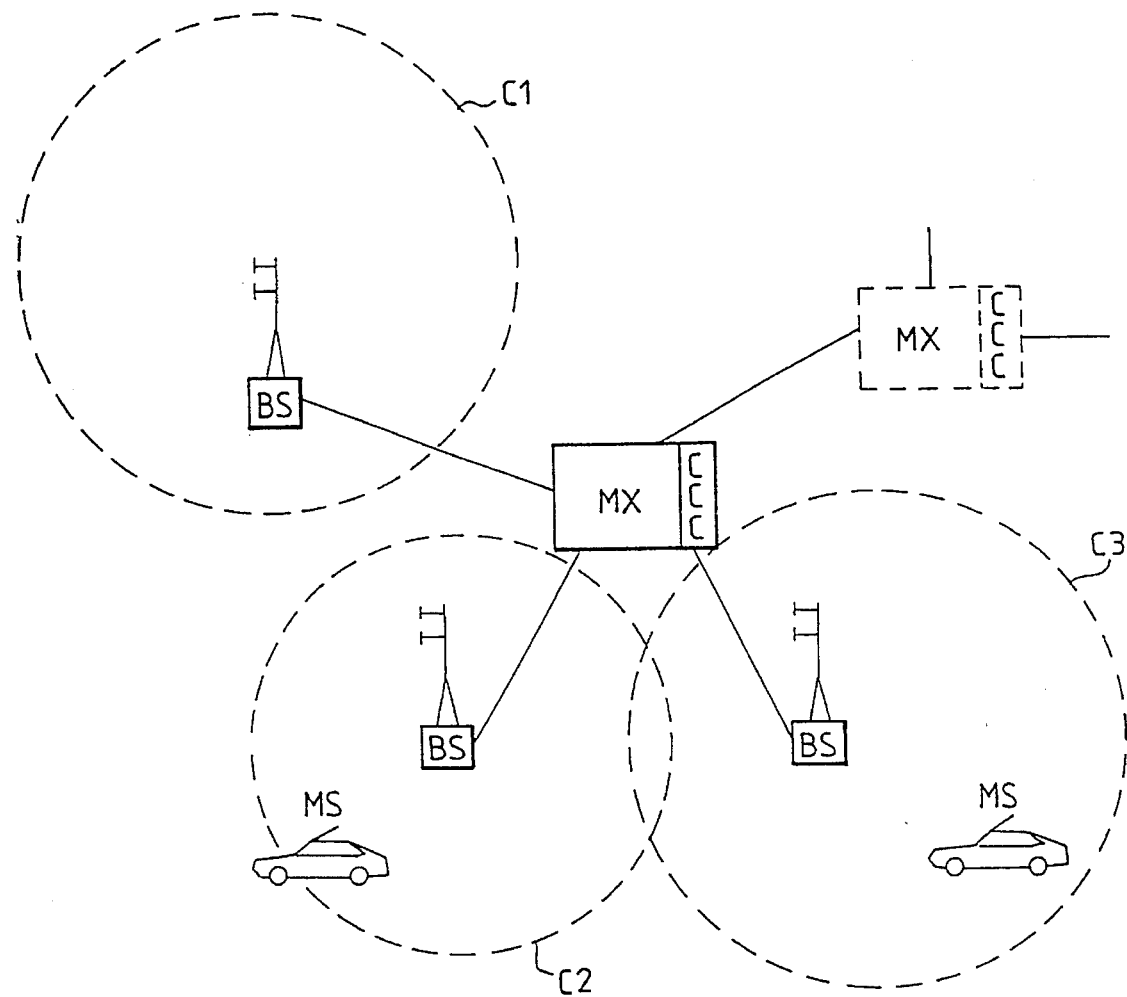
FIG. 1 illustrates a radio system in which the invention can be applied.

In principle, the invention may be applied in a TDMA radio system of any type. FIG. 1 shows a trunked mobile radio system in which the geographical coverage area of the system is divided into smaller service areas, i.e. radio cells C1, C2 and C3, which are separate, border on one another or have overlapping peripheral areas. Each cell C1, C2, C3 incorporates at least one fixed, typically multi-channel transceiver apparatus BS, called a base station. All base stations are connected with fixed connections, such as cables, to a mobile exchange MX. It is the task of the MX to connect the calls to the mobile stations and to control the operation of the entire system. It is the task of the base stations BS to convert the signals of the MX for the radio path and to be in radiocommunication with subscriber stations MS roaming freely within the area of the system on radio coverage areas, i.e. radio channels, allocated for the system to enable the mobile stations to communicate with the MX. Depending on the implementation, the intelligence can be variously divided between these three basic elements, the MX, BS and MS.

Radio networks usually operate in such a way that the signalling required for establishing calls (as well as the registration of MSs with the system) is performed on a control channel(s) and the calls are executed on traffic channels. This requires each base station to have more than one channel, since at least one channel is needed as a control channel and at least one channel as a traffic channel. Typically one control channel and several traffic channels are provided.

Figure 2:
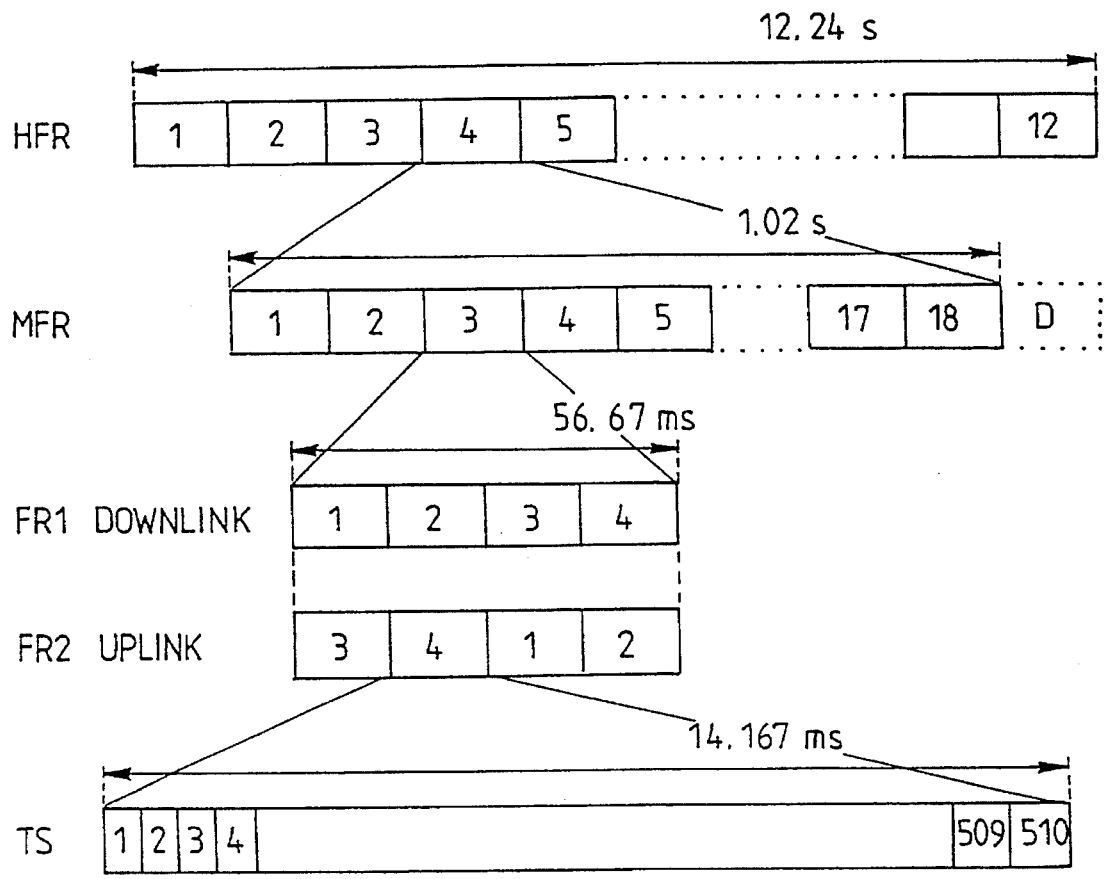
FIG. 2 illustrates a TDMA frame structure.

In a trunked radio system, several user groups, even several user organizations share a common group of channels. In a digital TDMA system, each pair of downlink and uplink radio carriers is further divided into time slots, i.e. physical channels for which time slot numbers are used as identifiers. FIG. 2 illustrates a TDMA frame structure comprising a hyperframe HFR, multiframe MFR, frames FR and time slots TS.

The basic block of the TDMA system is a time slot TS. In an exemplary case, four time slots TS form a TDMA frame FR. A multiframe comprises 18 frames FR and has a duration of about one second. A hyperframe HFR, formed of 12 multiframes MFR, is the longest recurring time period in the TDMA structure.

Logical channels are conveyed on physical channels, i.e. in time slots. Logical channels may be divided into two categories: traffic channels for conveying digital useful information and control channels for passing signalling messages. These two main categories may be further divided into various subcategories.

When a mobile station MS is registered with a base station BS and listens to the carrier of the base station, it is normally locked into a specific TDMA time slot. This time slot may be a traffic channel or a control channel, depending on whether a call is in progress or not.

Figure 3:
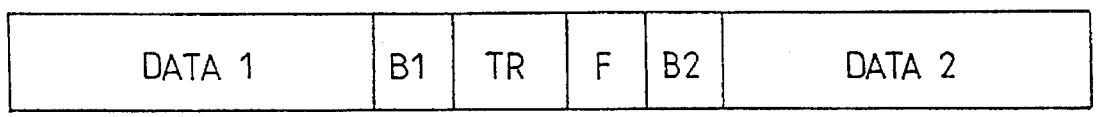
FIG. 3 illustrates a TDMA burst.

In each time slot, a burst, which is a data stream modulated period of carrier having a maximum duration equal to the duration of the time slot and thus representing the physical content of the time slot, is sent. A burst contains a specific number of modulated bits, forming various fields depending on the burst type. FIG. 3 shows a burst sent on a downlink traffic channel (from a BS to a MS), comprising in this exemplary case 510 modulated bits forming scrambled data fields DATA1 and DATA2, a training sequence field TR, a flag field F and broadcast blocks B1, a B2. The fields DATA1 and DATA2 (for example 2×216 bits) convert the data bits (speech) into bits scrambled with a specific algorithm, which provides high privacy for calls. The training sequence field TR (for example 24 bits) transmits the synchronizing word employed for the synchronization of the MS. The flag field F (for example 6 bits) can be used to indicate various time slot states. The broadcast fields B1 (for example 26 bits) and B2 (for example 28 bits) are used to transmit various information to the MS.

As has been explained previously, the problem relative to semiduplex traffic has been that an MS locked on a traffic channel for a specific call may remain on said channel in an undesired manner even after the radio system has released the call by a special release message.

In the present invention, each call on the same traffic channel (i.e. in the same time slot) is provided with a call identifier such that at least two successive calls have different call identifiers. The system assigns the call identifier at the beginning of the call and inserts it in every downlink burst sent on the traffic channel. The MS stores the call identifier it has received at the beginning of the call and thereafter monitors the call identifier it receives in each burst and remains on the traffic channel and with the call as long as the call identifier received in the bursts is the same as at the beginning of the call. When the system releases the call and/or initiates a new call, it changes the call identifier to be sent in the bursts on the traffic channel. Upon detecting the change of call identifier, the MS knows that the original call has been terminated and leaves the traffic channel. The identifying of calls in accordance with the invention and the call release based thereon effectively ensures that the MS will not remain dangling on the traffic channel even though the call has been released. The invention also eliminates sending of call release messages to the MS, which reduces the signalling load.

Suitable messages must be available for the identification. In a preferred embodiment of the invention, the call identifier is incorporated in the message sent in the broadcast blocks B1 and B2 shown in FIG. 3. The burst and blocks B1, B2 illustrated in FIG. 2 are only sent in the direction BS-MS (downlink). Naturally, identifying is only needed in this direction, as the MX knows which calls are currently in progress. In a preferred embodiment, the selection and change of the call identifier of the invention and its insertion in the broadcast block is performed on the system side by a call control computer CCC integrated in the mobile exchange.

The call identifier is preferably a call number, but it may also be an alphanumeric identifier, for instance. In principle, two different numbers suffice to distinguish two successive calls, i.e. the ongoing call and the following call. In practice, however, it is preferred to employ at least four different numbers, and this can be realized by means of two information bits of block B1 or B2. In a preferred embodiment of the invention, the call identifier is formed by the two last information bits of block B2.

Figure 4:
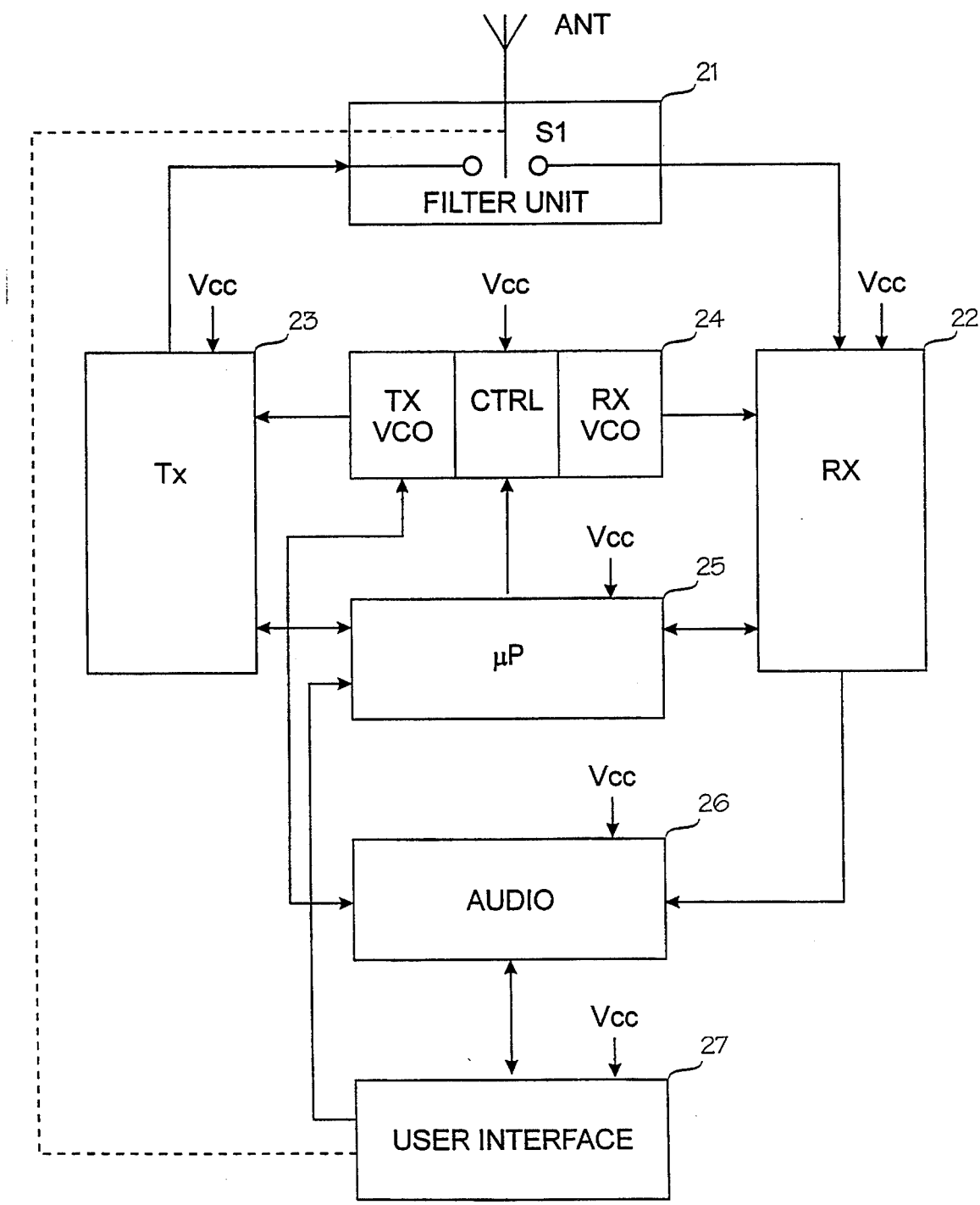
FIG. 4 is a block diagram of a mobile station according to the invention.

FIG. 4 shows a schematic block diagram of a MS comprising ten functional elements: control logic 25 (microprocessor), transmitter 23, receiver 22, filter unit 21, synthesizer 24, audio unit 26, handset 27. The processor unit 25 performs all control operations of the radio unit, operation of keypad and display, processing of the signalling, serial traffic, and possibly generation of signalling tones and DTMF post-selections. The audio unit 26 processes the low-frequency signal received from the receiver 22 and applies it to a loudspeaker or receiver. Likewise, the audio unit processes the signal received from the microphone and gives it a correct deviation level prior to the application of the signal to the oscillator TXVCO of the synthesizer 24. The synthesizer 24 forms an injection signal for the receiver 22 and a modulated transmission signal for the transmitter 23. The synthesizer comprises three parts, i.e. control logic for the synthesizer and voltage-controlled oscillators TXVCO and RXVCO for the transmitter and receiver. It is the task of the receiver 22 to extract the desired frequency from the signal derived from the antenna ANT, to amplify said frequency and to express the low-frequency signal. The receiver 22 applies the low-frequency signal to the audio unit 26 and the received signalling messages to the processor unit 25. It is the task of the transmitter 23 to amplify the modulated signal obtained from the TXVCO of the synthesizer 24 for the desired transmission power (a few watts). The oscillator TXVCO of the synthesizer 24 also modulates the signalling messages supplied by the processor unit, said messages being subsequently amplified in the transmitter 23. The filter unit 21 separates the transmitting and receiving frequencies. Furthermore, the filter unit incorporates a transmission switch (pressel) S1 wherewith the user can manually switch the antenna ANT either to the transmitter 23 or to the receiver 22. The handset 27 forms a man-machine interface. The handset includes at least a keypad and preferably also a numeric or an alphanumeric display. The handset may also incorporate a receiver and a microphone.

Figure 5:
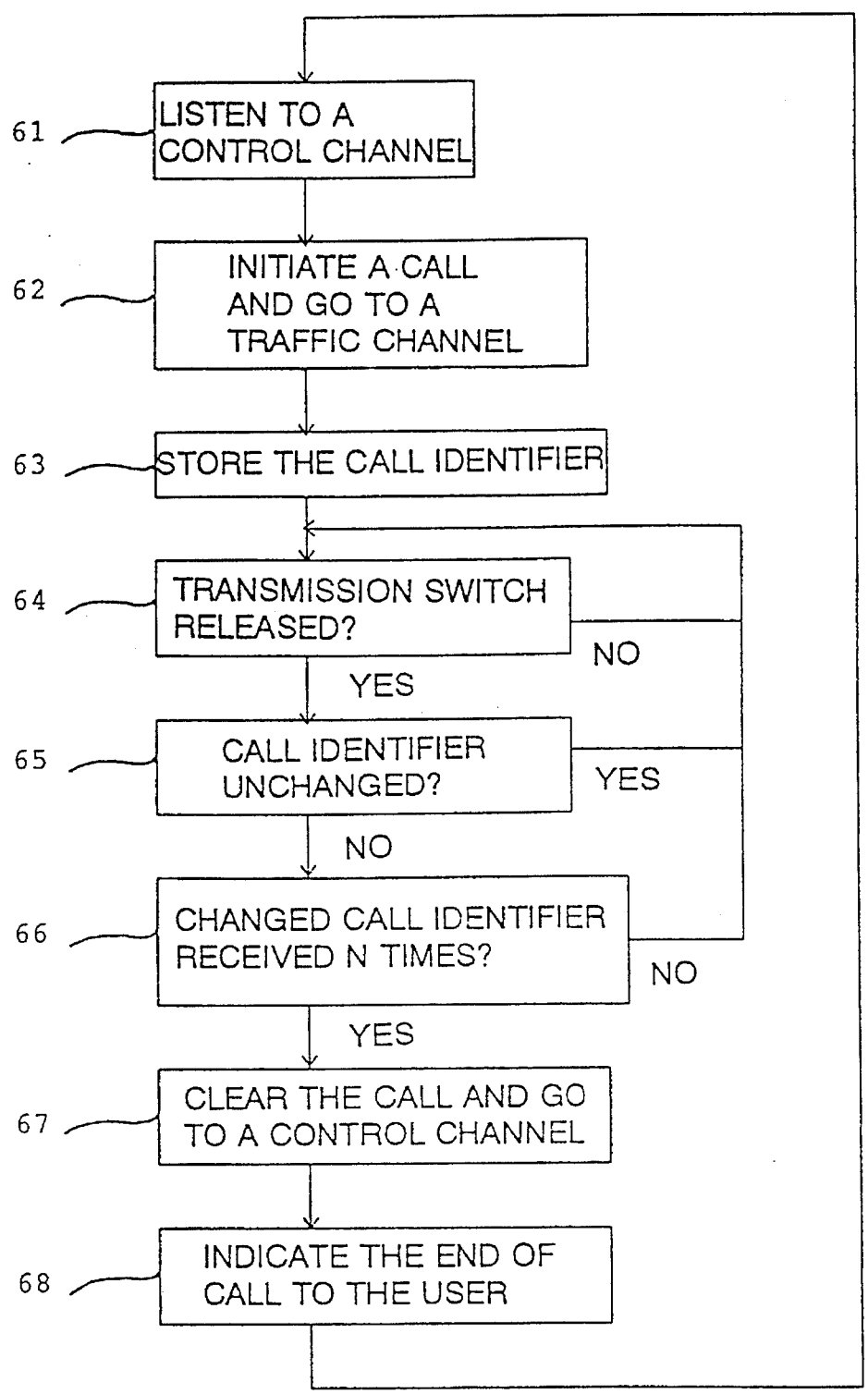
FIG. 5 is a flow diagram illustrating the call identification procedure at the mobile station.

In a preferred embodiment the processor unit 25 performs the call release and monitors the continuation of the call in accordance with the procedure shown in the flow diagram of FIG. 5.

Let us assume that at 61, the MS is in an initial state in which there is no ongoing call, and listens to the control channel. At 62, a call is established in accordance with the call establishment protocol of the radio system, and the MS is tuned to the traffic channel allocated for the call. At 63, the processor unit 25 stores the call identifier received in the first burst transmitted on the downlink traffic channel at the beginning of the call. At 64, the processor unit 25 checks whether the transmission switch S1 is released, and in an affirmative case checks at 65 whether the call identifier received in a new downlink burst has remained unchanged. If the call identifier has remained unchanged, one proceeds with the call and returns to 64. If the call identifier has changed from that stored at the beginning of the call, one proceeds to 66, at which point one checks whether the call identifier is changed in a predetermined number N of consecutive bursts. If the number N is not full, one returns to 64. If the number N is full, the processor unit 25 assumes that the call has ended and terminates the call on the MS side and goes to listening to the control channel (67), simultaneously notifying the user of the termination of the call (68) through the handset 27. The check at step 66 prevents individual transmission errors from causing any unnecessary clearing from the call. Herein also any other suitable procedure may be used.

The figures and the description pertaining thereto are only intended to illustrate the present invention. The method and system according to the invention may vary in their details within the scope of the appended claims.

I claim:

1. A call control method in a digital TDMA radio system comprising mobile radio stations and a fixed radio network with base stations, each of said base stations having at least one carrier for conveying control channels and traffic channels in TDMA time slots, said method comprising steps of:

commanding a mobile station to a traffic channel for a call by signalling performed on a control channel at the beginning of the call, commanding the mobile station through the traffic channel to terminate the call and to leave the traffic channel at the end of the call, characterized by steps of:

assigning a call identifier for the call to be established, sending the call identifier intermittently on the traffic channel during the call, commanding the mobile station to terminate the call and to leave the traffic channel by changing said call identifier sent on the traffic channel at the end of the call.

2. A method as claimed in claim 1, characterized by a step of replacing the call identifier of the ongoing call on the traffic channel by a call identifier of a next call.

3. A method according to claim 1, characterized by a step of allocating different call identifiers for at least two successive calls.

4. A method as claimed in claim 1, wherein the step of sending the call identifier is characterized by sending the call identifier in a broadcast field of every burst transmitted in a time slot in the traffic channel.

5. A digital TDMA radio system, comprising:

mobile radio stations (MS), a fixed radio network comprising base stations (BS) each having at least one carrier for conveying control channels and traffic channels in TDMA time slots, call control means (CCC) for controlling call establishment of the mobile radio stations by signalling sent on the control channels and for controlling call release by control information sent on the traffic channels, characterized in that the control information sent on a respective one of said traffic channels includes a call-specific call identifier for a call, and that a mobile station (MS) comprises means (25) for activating clearing of said mobile station from said call in response to a change of the call identifier during said call.

6. A system as claimed in claim 5, characterized in that at least two successive calls have different call-specific call identifiers.

7. A system as claimed in claim 5, characterized in that the call identifier is incorporated in a broadcast field (B1, B2) of a burst sent in a time slot of said respective one of said traffic channels.

8. A method for call release in terminal equipment in a digital TDMA radio system, characterized by steps of:

receiving a call-specific call identifier in each burst on a traffic channel during a call, storing the call identifier received at the beginning of the call, comparing call identifiers subsequently received with the stored call identifier, clearing the call when a change of the call identifier is detected.

9. A method as claimed in claim 8, characterized in that the call identifier is interpreted as having changed when the changed call identifier is received in a predetermined number of consecutive bursts.

10. Semiduplex terminal equipment for a digital TDMA radio system, wherein several control channels and traffic channels are conveyed in TDMA time slots on each radio channel, comprising:

an antenna (ANT), a transmitter (23), a receiver (22), a transmission switch (S1) for alternately connecting the transmitter and the receiver to the antenna, a frequency synthesizer (24) for tuning the transmitter and the receiver to a desired radio channel, control means (25) for controlling the operation of the terminal equipment and for processing control messages received on the control and traffic channels, characterized in that the control means (25) is responsive to a call-specific call identifier sent on a traffic channel during a call for initiating clearing from said call upon detection of a change of said call identifier during the call.

* * * * *